United States Patent [19]

Hayes et al.

[11] Patent Number: 5,726,259
[45] Date of Patent: Mar. 10, 1998

[54] BIMODAL LATEX BINDER

[75] Inventors: Peter C. Hayes; Nick Triantafillopoulos, both of Stow, Ohio

[73] Assignee: GenCorp Inc., Fairlawn, Ohio

[21] Appl. No.: 679,544

[22] Filed: Jul. 12, 1996

Related U.S. Application Data

[62] Division of Ser. No. 498,105, Jul. 5, 1995.

[51] Int. Cl.⁶ ............................................. C08F 2/24
[52] U.S. Cl. .................... 526/80; 524/458; 524/460; 526/65; 526/66; 526/79; 526/81
[58] Field of Search ................... 526/65, 66, 79, 526/80, 81; 524/458, 460

[56] References Cited

U.S. PATENT DOCUMENTS

| | | | |
|---|---|---|---|
| 4,134,872 | 1/1979 | Lee | 524/460 |
| 4,254,004 | 3/1981 | Abbey | 526/80 |
| 4,567,099 | 1/1986 | Van Gilder et al. | 428/327 |
| 4,975,473 | 12/1990 | Kaneda et al. | 523/221 |

*Primary Examiner*—Peter A. Szekely
*Attorney, Agent, or Firm*—Robert F. Rywalski; Larry R. Meenan

[57] ABSTRACT

A bimodal latex having high printing strength, reduced residue and a controlled polymer gel content which can be utilized for paper coating compositions and to a process for making the bimodal latex. The high strength bimodal latex, prepared by emulsion polymerization, includes in polymerized form open chain conjugated diene monomer, alkenyl aromatic monomer and at least one ethylenically unsaturated monomer selected from the group consisting of ethylenically unsaturated carboxylic acid and derivatives thereof.

17 Claims, No Drawings

BIMODAL LATEX BINDER

This is a divisional Ser. No. 08/498,105 filed on Jul. 5, 1995.

FIELD OF THE INVENTION

This invention relates to a bimodal latex binder for producing high strength paper coating formulations. More particularly, this invention relates to a high printing strength bimodal latex binder having reduced residue and a controlled polymer gel content which can be utilized for paper coating compositions and to a process for making the high strength bimodal latex binder.

BACKGROUND OF THE INVENTION

Paper coating formulations typically include mineral fillers and binders with small amounts of additives which are applied to at least one side of a paper sheet. The paper coating formulations may be prepared to mask or change the appearance of the paper sheet, improve opacity, impart a smooth and receptive surface for printing to allow full contact between the inked image areas of a plate or transfer blanket and the paper sheet surface, or provide special properties for particular functional purposes.

For example, the required properties of the paper sheet may vary depending upon the printing process utilized. It will be appreciated that the printing process imposes tensile stress normal to the plane of the paper sheet. The stress level depends upon the tack of the printing ink used and the velocity of separation of the printing plate from the paper sheet. The stress imposed also tends to pick the paper sheet, i.e., lift off material, unless the paper sheet has adequate pick strength. Paper sheets which are to be printed by offset lithography typically require high pick strength because of the extremely tacky inks which are employed, whereas letterpress papers do not require such a high pick strength. However, higher pick strength is required for multicolor printing as opposed to single color printing in both offset lithography and letterpress because of the range of tack required in the inks at each inked station.

One way to test the pick strength of a paper for printing is by using the Paper and Ink (P&I) Stability test which measures the splitting force, or tack, of a paper sample as the sample passes repeatedly over an inked printing blanket roll. Every time the sample passes over the print image on the blanket the force is measured. This process is repeated until visible pick outs are observed onto the paper sample at which point the test is stopped. The reported quantity is the slope of the force as a function of number of passes (or time) which is based on connecting with a straight line the values of the force at the second and last passes. Lower slopes indicate slow ink setting, i.e., low ink tack buildup, and indicate that a paper will not fail due to poor strength during printing. Also, a high number of passes before picking are required to avoid piling and tail edge picking during printing. Low slope and high passes to fail are desirable for offset merchant and publication papers and signify high printing strength. This is an important concept for the subject of the invention described herein.

In view of the foregoing it will be appreciated that the selection and use of materials in the paper coating formulation often affect the coating process and the performance of the final product. One material that strongly affects the end-use performance and printing properties is the latex that is used to bind the paper coating pigments together.

As is well known in the art, carboxylated styrene-butadiene copolymer latices are useful and generally well suited for use as a binder component for pigments in conventional paper coating compositions. Styrene butadiene latices are designed for use over a wide range of application conditions. They must be mechanically stable to the high shear forces encountered on blade type coaters in paper coatings. Additionally, they must be chemically stable in order to be compatible with the various pigments, starches, proteins, insolubilizers, thickeners, lubricants and miscellaneous additives commonly used.

The bimodal latex binder in accordance with the present invention provides excellent printing strength and greater porosity when compared to conventional carboxylated styrene-butadiene latices. The bimodal latex gives low P&I slopes, indicating slower absorption of the offset ink vehicle into the sheet and a reduced rate of ink tack build. The bimodal latex also provides more P&I passes to failure before coating pickout which is important for printing performance. Additionally, the bimodal latex provides improved wet pick and ink receptivity, particularly in coating formulations where low levels of starch are used as a cobinder.

It is a further feature of the present invention that the bimodal latex binder exhibits improved residue levels. Residue is a measure of oversized non-usable polymer formed during the production and processing of the latex binder. It will be appreciated that reduced residue levels leads to easier processing during manufacture of the latex and better quality paper sheet after coating operations.

SUMMARY OF THE INVENTION

Briefly, according to this invention there is provided a high printing strength bimodal latex having a low residue for use in paper coating and a process for producing the bimodal latex. The bimodal latex is prepared by emulsion polymerization and includes in polymerized form open chain conjugated diene monomer, alkenyl aromatic monomer and at least one ethylenically unsaturated monomer selected from the group consisting of ethylenically unsaturated carboxylic acid and derivatives thereof. The bimodal latex has a residue level of less than about 100 ppm (parts per million), contains no more than about 50 wt % polymeric solids and has about 10–50 wt % polymer particles of a size of approximately 500–800 Å and about 50–90 wt % polymer particles of a size of approximately 1500–2000 Å. In a preferred embodiment the bimodal latex has a residue level of about 50 to 100 ppm.

The bimodal latex can be utilized as a binder for paper coating compositions including an aqueous medium having dispersed therein a functionally effective amount of a finely divided mineral filler. The bimodal latex when mixed with the mineral filler in the aqueous medium provides a paper coating formulation having a Paper & Ink stability test slope of about 2 to 10.

The bimodal latex may be prepared by a multi-stage emulsion polymerization process. The process includes the steps of forming a first polymeric seed by charging into a reaction zone of a reactor an aqueous emulsion polymerizable mixture including at least one emulsion polymerizable monomer, surfactant, chelating agent and free radical initiator; subsequently charging to the reaction zone of the reactor over a plurality of stages aqueous emulsion polymerizable mixtures including at least one polymerizable monomer, about 1.0 to 2.0 wt % chain transfer agent and about 0 to 5 wt % surfactant; reacting the emulsion polymerizable mixture to about 70 to 80 percent conversion; forming a second polymeric seed in the reactor by charging into the reaction zone of the reactor an aqueous emulsion polymerizable mixture including at least one emulsion polymerizable monomer, surfactant and free radical initiator; subsequently charging to the reaction zone of the reactor over a plurality of stages aqueous emulsion polymerizable mixtures including at least one polymerizable monomer, about 0.5 to 2.0 wt % chain transfer agent and about 0 to 5 wt % surfactant; and reacting the emulsion polymerizable mixture to a conversion of at least about 98 percent to form the bimodal latex.

DETAILED DESCRIPTION OF THE PREFERRED EMBODIMENTS

The bimodal latex of this invention is obtainable by copolymerization of an aliphatic conjugated diene monomer, monoolefinic monomer and at least one ethylenically unsaturated monomer selected from the group consisting of ethylenically unsaturated carboxylic acid and derivatives thereof such as esters, amides and nitriles of ethylenically unsaturated carboxylic acid.

The aliphatic conjugated diene monomers generally contain from about 4 to about 8 carbon atoms, and desirably from about 4 to about 6 carbon atoms. Examples of specific diene monomers include piperylene, isoprene, 2,3-dimethyl-1,3, butadiene and the like, and preferably, 1,3-butadiene. Mixtures of two or more conjugated dienes may also be used. The alipahitic conjugated diene monomers are used in amount of about 5 to 60 parts by weight, preferably 15 to 50 parts by weight, per 100 parts by weight of the total amount of monomers added.

The monoolefinic monomers are alkenyl aromatic compounds having from about 8 to about 12 total carbon atoms. Examples of specific alkenyl aromatic compounds include α-methyl styrene, p-tertiary butyl styrene, methyl vinyl toluene, p-vinyl toluene, 3-ethyl styrene, and the like, with styrene being preferred. Mixtures of two or more alkenyl aromatic compounds can also be utilized. The monoolefinic monomers are used in an amount of about 60 to 95 parts by weight per 100 parts by weight of the total amount of monomers added.

The ethylenically unsaturated monomers include ethylenically unsaturated carboxylic acid and derivatives thereof. The ethylenically unsaturated monomers may vary so long as such monomers are copolymerizable with the aliphatic conjugated diene and monoolefinic monomers. Examples of specific ethylenically unsaturated carboxylic acid monomers include acrylic acid, methacrylic acid, fumaric acid, crotonic acid, maleic acid, itaconic acid and the like, and combinations of two or more such acids. Preferably the ethylenically unsaturated carboxylic acid is acrylic acid and itaconic acid. The carboxylic acid monomer is used in amounts of about 0.5 to 25 parts by weight per 100 parts by weight of the total amount of monomers added. Derivatives of ethylenically unsaturated carboxylic acid include esters, amides and nitriles of ethylenically unsaturated carboxylic acid. Examples of amides of ethylenically unsaturated carboxylic acid include various unsaturated amides or derivatives thereof having a total of from about 3 to 12 carbon atoms. Examples of unsaturated amides or derivatives thereof include hydroxyethyl acrylate, hydroxyethyl methacrylate, hydroxymethyl acrylate, hydroxymethyl methacrylate, hydroxypropyl acrylate, hydroxypropyl methacrylate, (meth)acrylamide, propenamide, dimethylacrylamide, derivatives of the various amide containing monomers and combinations of the foregoing. The amount of such amide monomer is generally from about 0.1 to 5 parts by weight per 100 parts by weight of the total amount of monomers added. Examples of esters of ethylenically unsaturated carboxylic acid which may be utilized to improve ink gloss coating properties in paper applications include the various alkyl (meth)acrylate and hydroxyl derivatives thereof, wherein the alkyl portion has from 1 to 10, preferably from 1 to 4 carbon atoms with specific examples including butyl acrylate, 2-ethylhexyl acrylate, propyl acrylate, ethyl acrylate, and the like. The amount of such ester monomer is generally from about 0.1 to 30 parts by weight per 100 parts by weight of the total amount of monomers added. Examples of nitriles of ethylenically unsaturated carboxylic acid include acrylonitrile which can be utilized in an amount of from about 0.1 to 25 and preferably from about 5 to 15 parts by weight per 100 parts by weight of the total amount of monomers added.

Other conventional monomers can optionally be utilized in conventional amounts include various organic salts, for example sodium styrene sulfonate or the 3-sulfopropyl (meth)acrylate salt of sodium or potassium to control particle size.

The above monomers are polymerized in the presence of water to form the latex binder of the present invention using conventional emulsion polymerization procedures and techniques except as otherwise provided herein. Free radical initiators, optional chain transfer agents, various emulsifiers, chelating agents and the like can be used as set forth in U.S. Pat. No. 5,166,259 to Schmeing and White, incorporated herein by reference.

The free radical initiators utilized to polymerize the various monomers include sodium persulfate, ammonium persulfate, potassium persulfate and the like. Other free radical initiators can be utilized which decompose or become active at the polymerization temperature such as various peroxides, e.g., cumene hydroperoxide, dibenzoyl peroxide, diacetyl peroxide, dodecanoyl peroxide, di-t-butyl peroxide, dilauroyl peroxide, bis(p-methoxy benzoyl) peroxide, t-butyl peroxy pivalate, dicumyl peroxide, isopropyl percarbonate, di-sec-butyl peroxidicarbonate, various azo initiators such as azobisdimethyivaleronitrile, 2, 2'-azobisisobutyronitrile, 2,2'-azobis(2-amidinopropane) dihydrochloride, 2,2'-azobis-2-methyl-butyronitrile, 2,2'-azobis(methylisobutyrate), and the like and mixtures thereof. The amount of the free radical initiator is generally from about 0.1 to 2, and preferably from about 0.5 to 1.0 parts by weight per 100 parts by weight of the total amount of monomers added.

Optional chain transfer agents include mercaptans such as the alkyl and/or aralkyl mercaptans having from about 8 to about 18 carbon atoms and preferably from about 12 to about 14 carbon atoms. The tertiary alkyl mercaptans having from about 12 to about 14 carbon atoms are highly preferred. Examples of specific chain transfer agents include n-octyl mercaptan, n-dodecyl mercaptan, t-octyl mercaptan, t-dodecyl mercaptan, tridecyl mercaptan, tetradecyl mercaptan, hexadecyl mercaptan and the like, as well as mixtures thereof. The amount of the chain transfer agent utilized is from about 0.2 to 2.5, and preferably from about 0.5 to 1.5 parts by weight per 100 parts by weight of the total amount of monomers added.

The emulsifiers can generally be any surfactant, soap, or the like which are well known in the art and stable at the pH of the bimodal latex in accordance with the present invention. Examples of specific emulsifiers include alkyl sulfates, alkyl sulfosuccinates, alkyl aryl sulfonates, α-olefin sulfonates, quaternary ammonium salts, amine salts, fatty or resin acid salts, nonyl or octyl phenol reaction products of ethylene oxide and the like. The alkyl portion of the various emulsifiers generally has from about 8 to about 18 carbon atoms. Examples of specific surfactants include sodium lauryl sulfate, sodium sulfosuccinates such as sodium dimethylamyl sulfosuccinate, sodium dodecyl diphenyloxide disulfonate and the like. The amount of emulsifier present is sufficient to obtain an aqueous emulsion of the monomers. Such an amount is typically from about 0.5 to 3.0 parts by weight per 100 parts by weight of the total amount of monomers added. Other surfactants that may be utilized include those identified in Surface Active Agents, Schwartz and Perry, Vol. I, Interscience Publishers, Inc., New York, 1958; Surface Activity, Moilet, Collie and Black, D. Van Nostrand Company, Inc. New York, 1961; Organic Chemistry, Feiser and Feiser, D. C. Heath and Company, Boston, 1944; and The Merck Index, Seventh Edition, Merck & Co., Inc., Rahway, N.J., 1960 all of which are hereby incorporated by reference.

Chelating agents may also be used during polymerization to tie up various metal impurities as well as to achieve a uniform polymerization. Examples of specific chelating agents include ethylene diamine tetra-acetic acid, nitrilotri-acetic acid, citric acid, and their ammonium, potassium and sodium salts. The amounts of the chelating agents may range from about 0.01 to 0.2 parts by weight per 100 parts by weight of the total amount of monomers added.

The polymerization process is effected by the selective addition of the various reactants in multiple stages to the reaction zone of a reactor as the reaction continues. The process includes the step of forming a first polymeric seed by charging into the reaction zone of the reactor an aqueous emulsion polymerizable mixture including at least one emulsion polymerizable monomer, surfactant, chelating agent and initiator. The surfactant is added above the critical micelle concentration. In a preferred embodiment, the surfactant, chelating agent and ethylenically unsaturated carboxylic acid and monoolefinic monomers, most preferably itaconic acid and styrene, are first added to the reactor, heated to about 150° F. and then an aqueous mixture of free radical initiator is added. The aqueous reactants are allowed to react and then the temperature is increased to about 170° F.

Subsequently, aqueous emulsion polymerizable mixtures including at least one polymerizable monomer, about 1.0 to 2.0 wt % chain transfer agent and about 0 to 5 wt % surfactant are charged to the reaction zone of the reactor over a plurality of stages. In a preferred embodiment, the aqueous polymerizable mixtures are charged to the reactor in a batch at a rate faster than the polymerization rate over about four separate stages such that after each charge the mixture is allowed to react within the reactor. The first stage includes an aqueous polymerizable mixture of surfactant, styrene, butadiene and chain transfer agent. The second and fourth stages include an aqueous polymerizable mixture of chain transfer agent, styrene, butadiene and acrylic acid. The third stage includes an aqueous polymerizable mixture of chain transfer agent, surfactant, styrene, butadiene and acrylic acid. The emulsion polymerizable mixture is then allowed to react in the reactor to about 29.0 to 33.0 percent solids. It will be appreciated that at about 29.0 to 33.0 percent solids about 70 to 80 percent of the monomer has been converted.

A second polymeric seed is then formed in the reactor by charging into the reaction zone of the reactor an aqueous emulsion polymerizable mixture including at least one emulsion polymerizable monomer, surfactant and free radical initiator. The surfactant is added above the critical micelle concentration. In a preferred embodiment, the at least one emulsion polymerizable monomer is styrene. In the succeeding stages aqueous emulsion polymerizable mixtures including at least one polymerizable monomer, about 0.5 to 2.0 wt % chain transfer agent and about 0 to 5.0 wt % surfactant are charged to the reaction zone of the reactor. In a preferred embodiment, the aqueous polymerizable mixtures are charged to the reactor over about five separate stages in batches at a rate faster than the polymerization rate such that after each charge the mixture is allowed to react within the reactor. The first, third and fifth stages include an aqueous polymerizable mixture of acrylic acid, styrene, butadiene and chain transfer agent. The second stage includes an aqueous polymerizable mixture of acrylic acid, styrene, butadiene, surfactant, chain transfer agent and free radical initiator. The fourth stage includes an aqueous polymerizable mixture of acrylic acid, styrene, butadiene, surfactant and chain transfer agent. The emulsion polymerizable mixture is then reacted to a constant solids to form the bimodal latex. It will be appreciated that at constant solids the monomer conversion to copolymer is approximately 98%. Finally, an initiator, defoamer and sodium hydroxide are added to the latex and stripped until the residual monolefinic monomer is about 0.05% or less. After stripping a suitable biocide well known in the art may be added.

Polymerization is generally carried out from about 120° F. to 200° F., and preferably from about 150° F. to 170° F. Polymerization is generally conducted in an acidic medium when acidic monomers are used and the pH of the latex binder is generally from about 1.0 to 6.5, preferably from about 1.5 to 4.0 and most preferably from about 1.5 to 3.0. Such high polymerization temperatures result in high conversion levels of monomer to copolymer. The bimodal latex also contains a controlled gel fraction of about 30 to 90 wt % and preferably, about 50 to 80 wt % that is of insoluble weight percent fraction in toluene at 68° F. The gel fraction is an indication of the extent of cross-linking present between polymer chains in the final structure of the polymer latex. It has been found that a gel fraction of about 30 to 60 wt % provides a bimodal latex coating formulation having good porosity and slope and a gel fraction of about 70 to 80 wt % provides a bimodal latex coating formulation having reduced porosity and low slope. The gel fraction is determined as the percentage of dried polymer that is insoluble in a specific solvent after 8 hours immersion. It will be appreciated that by controlling the gel fraction of the bimodal latex a variety of coating formulations may be made for varying paper coating applications and conditions. The amount of solids, that is of the bimodal latex, is generally from about 45 to 55 wt %, preferably about 50 wt % based upon the total weight of the bimodal latex and the remaining ingredients, e.g., water. The bimodal latex includes about 10 to 50, preferably about 20 to 30 weight percent small size particles and from about 50 to 90, preferably about 70 to 80 weight percent large size particles. The large size particles of the bimodal latex can vary in size from about 1500 to 2000 Å, more preferably about 1500 to 1700 Å in diameter. The small size particles of the bimodal latex can vary in size from about 500 to 800 Å, more preferably about 600 to 700 Å in diameter.

An additional important aspect of the present invention is that the bimodal latex formed by the polymerization process of the present invention shows improved residue levels. Residue is a measure of the oversized non-usable polymer formed during the production and processing of the latex. The amount of residue remaining is measured and reported as parts per million dry residue on wet weight or volume of latex. The test involves gravity filtering the latex through various sized screens; e.g., 325 mesh and determining the weight fraction that does not go through that filter size. Residue levels before stripping operations of the bimodal latex in accordance with the present invention are less than about 100 ppm and preferably about 50 to 100 ppm.

Coating formulations of this invention include an aqueous medium, an amount of a finely divided mineral filler and the bimodal latex. Examples of mineral fillers include those known in the art such as kaolin clay, satin white, calcium carbonate, titanium oxide, etc. The amount of filler which is employed can vary, depending upon the density of the filler and the coating properties desired. Typically, coating formulations are comprised mainly of filler particles and about 2 to about 25, preferably about 8 to about 16, parts of bimodal latex for 100 parts of filler by weight. Each of the aforementioned components is mixed in an aqueous medium to yield a formulation which is about 40 to about 70 percent solids by weight, and preferably about 55 to about 68 percent solids by weight. It is understood that other additives known in the art which include cobinders (e.g., starch, casein, protein, polyacrylate, polyvinyl alcohol), thickeners, cross-linking agent, a stabilizer, an anti-foaming agent, a surfactant, water retention aids and the like can be added to the coating formulation.

The coating formulations as described herein may be applied to a paper sheet through most any suitable coating device. For example, suitable methods of applying a latex coating to the paper include blade coaters, air knife coaters, rod coaters, roll coaters, and the like. For a more detailed discussion of various coating devices reference is made to U.S. Pat. No. 4,474,860 and Coating Equipment and Processes, O. L. Booth, Lockwood Publishing Co., Inc., 1970.

The coating formulations exhibited improved coating strength as evidenced by wet pick and dry pick tests and P&I Stability test.

The invention will be further clarified by a consideration of the following examples, which are intended to be purely exemplary of the invention.

EXAMPLE 1

A one gallon stainless steel pressure reactor equipped with monomer addition ports, stirrer and temperature and pressure measurement devices was used. Cooling was provided by an external water bath.

A mixture of deionized water 878 g, Dowfax 2A1 (15%) 12 g, Hampene NA3 (40%) 2 g, itaconic acid 15g and styrene 113 g was added to the reactor and then heated to 150° F. A solution of sodium persulfate 6.7 g in deionized water 61 g was then added to the reactor. After 30 minutes the reactor temperature was increased to 170° F. and then the following polymerizable mixtures identified in stages in Table 1 below were sequentially added every 30 minutes.

TABLE 1

| | Weight, grams |
|---|---|
| Stage 1 | |
| Dowfax 2A1 | 3.0 |
| styrene | 82 |
| dodecyl mercaptan | 2.5 |
| butadiene | 60 |
| deionized water | 30 |

TABLE 1-continued

| | Weight, grams |
|---|---|
| Stage 2 | |
| styrene | 82 |
| dodecyl mercaptan | 2.5 |
| butadiene | 60 |
| acrylic acid | 5.6 |
| deionized water | 15 |
| Stage 3 | |
| styrene | 82 |
| dodecyl mercaptan | 2.5 |
| butadiene | 60 |
| acrylic acid | 5.6 |
| deionized water | 45 |
| Dowfax 2A1 | 4.5 |
| Stage 4 | |
| styrene | 82 |
| dodecyl mercaptan | 2.5 |
| butadiene | 60 |
| acrylic acid | 5.6 |
| deionized water | 15 |

After the addition of the polymerizable mixture of Stage 4 to the reactor the mixture was reacted to about 29 to 33 wt % solids and then reseeded. In the reseeding stage a mixture of deionized water 50 g, Avirol 2020 (30%) 50 g, sodium persulfate 2.3 g and styrene 52 g was added to the reactor. The following polymerizable mixtures identified in stages in Table 2 below were then sequentially added to the reactor every 30 minutes.

TABLE 2

| | Weight, grams |
|---|---|
| Stage 1 | |
| styrene | 82 |
| dodecyl mercaptan | 2.5 |
| butadiene | 60 |
| acrylic acid | 5.6 |
| deionized water | 15 |
| Stage 2 | |
| styrene | 82 |
| dodecyl mercaptan | 2.5 |
| butadiene | 60 |
| acrylic acid | 5.6 |
| deionized water | 89 |
| Dowfax 2A1 | 4.5 |
| sodium persulfate | 1.5 |
| Stage 3 | |
| styrene | 82 |
| dodecyl mercaptan | 2.5 |
| butadiene | 60 |
| acrylic acid | 5.6 |
| deionized water | 15 |
| Stage 4 | |
| styrene | 82 |
| dodecyl mercaptan | 2.5 |
| butadiene | 60 |
| acrylic acid | 5.6 |
| deionized water | 45 |
| Dowfax 2A1 | 3.0 |
| Stage 5 | |
| styrene | 82 |
| dodecyl mercaptan | 2.5 |
| butadiene | 60 |

TABLE 2-continued

| | Weight, grams |
|---|---|
| acrylic acid | 5.6 |
| deionized water | 15 |

The polymerizable mixture was then reacted in the reactor until constant solids. The conversion of monomers to polymer was about 98%.

Sodium hydroxide (13%) 81 g, deionized water 150 g, sodium persulfate 3 g, Drew L198 3 g were added to the reactor and allowed to react for 60 minutes and then cooled to 150° F. and transferred to a stripping vessel and steam stripped and filtered in a conventional manner for approximately 3 hours or until the residual styrene was 0.05 wt % or less. The bimodal latex was then cooled to 75° F. A biocide Kathon LX (3.5%) 24.3 g was then added to the bimodal latex.

The latex was then filtered through a 325 mesh screen to remove small quantities of coagulum. The bimodal latex had a total solids content of about 50%, pH of about 6.9, surface tension of 45 dyne/cm and a Brookfield viscosity of 200 cps. The particle size distribution was measured using a capillary hydrodynamic fractionation apparatus. Two modes were observed at about 690 Å and about 1615 Å. The smaller size particles were about 20 to 25% of the distribution on a weight basis and the larger size particles were about 75 to 80% on a weight basis. The bimodal latex had a gel content of about 63%.

EXAMPLE 2

Another bimodal latex in accordance with the present invention was synthesized in the manner described in Example 1. A mixture of deionized water 930 g, Dowfax 2A1 (15%) 11 g, Hampene NA3 (40%) 2 g, itaconic acid 15 g and styrene 75 g was added to the reactor and then heated to 150° F. A solution of sodium persulfate 6.7 g in deionized water 61 g was then added to the reactor and then the temperature was raised to 150° F. After 30 minutes the reactor temperature was increased to 170° F. and then the following polymerizable mixtures identified in stages in Table 3 below were sequentially added every 30 minutes.

TABLE 3

| | Weight, grams |
|---|---|
| Stage 1 | |
| Dowfax 2A1 | 3.75 |
| styrene | 86 |
| acrylic acid | 4.2 |
| dodecyl mercaptan | 2.5 |
| butadiene | 60 |
| deionized water | 30 |
| Stage 2 | |
| Dowfax 2A1 | 3.75 |
| styrene | 86 |
| acrylic acid | 4.2 |
| dodecyl mercaptan | 2.5 |
| butadiene | 60 |
| deionized water | 30 |
| Stage 3 | |
| Dowfax 2A1 | 3.75 |
| styrene | 86 |
| acrylic acid | 4.2 |

TABLE 3-continued

| | Weight, grams |
|---|---|
| dodecyl mercaptan | 2.5 |
| butadiene | 60 |
| deionized water | 30 |
| Stage 4 | |
| Dowfax 2A1 | 3.75 |
| styrene | 86 |
| acrylic acid | 4.2 |
| dodecyl mercaptan | 2.5 |
| butadiene | 60 |
| deionized water | 30 |

After the addition of the polymerizable mixture of Stage 4 to the reactor the mixture was reacted to about 29 to 33 wt % solids and then reseeded. In the reseeding stage a mixture of deionized water 100 g, sodium dodecyl sulfate 15 g, sodium persulfate 2.3 g and styrene 52 g was added to the reactor. The following polymerizable mixtures identified in stages in Table 4 below were then sequentially added to the reactor every 30 minutes.

TABLE 4

| | Weight, grams |
|---|---|
| Stage 1 | |
| styrene | 71.6 |
| dodecyl mercaptan | 2.1 |
| butadiene | 58.3 |
| acrylic acid | 4.6 |
| deionized water | 36.6 |
| Stage 2 | |
| styrene | 71.6 |
| dodecyl mercaptan | 2.1 |
| butadiene | 58.3 |
| acrylic acid | 4.6 |
| deionized water | 36.6 |
| Stage 3 | |
| styrene | 71.6 |
| dodecyl mercaptan | 2.1 |
| butadiene | 58.3 |
| acrylic acid | 4.6 |
| deionized water | 36.6 |
| Stage 4 | |
| styrene | 71.6 |
| dodecyl mercaptan | 2.1 |
| butadiene | 58.3 |
| acrylic acid | 4.6 |
| deionized water | 36.6 |
| Stage 5 | |
| styrene | 71.6 |
| dodeyl mercaptan | 2.1 |
| butadiene | 58.3 |
| acrylic acid | 4.6 |
| deionized water | 36.6 |
| Stage 6 | |
| styrene | 71.6 |
| dodecyl mercaptan | 2.1 |
| butadiene | 58.3 |
| acrylic acid | 4.6 |
| deionized water | 36.6 |

The polymerizable mixture was then reacted in the reactor until constant solids. The conversion of monomers to polymer was about 99% as determined by a total solids measurement.

Sodium hydroxide (13%) 81 g, deionized water 94 g, sodium persulfate 3.8 g, Drew L198 3 g were added to the reactor and allowed to react for 60 minutes and then cooled to 150° F. and transferred to a stripping vessel and steam stripped and filtered in a conventional manner for approximately 3 hours or until the residual styrene monomer was 0.05 wt % or less. The bimodal latex was then cooled to 75° F. A biocide Kathon LX (3.5%) 24 g, non-ionic surfactant Igepal CO 897 16 g and deionized water 15 g were then added to the bimodal latex.

EXAMPLES 3–8

Several additional bimodal latices in accordance with the present invention were synthesized utilizing the method described in Example 1. The only difference between the method described in Example 1 and Examples 3–8 is in the relative proportions of monomers provided in Table 1 and Table 2. The following polymerizable mixtures identified in stages in Table 5 below were sequentially added every 30 minutes for each example.

TABLE 5

|  | Example 3 Weight, gram | Example 4 Weight, gram | Example 5 Weight, gram | Example 6 Weight, gram | Example 7 Weight, gram | Example 8 Weight, gram |
|---|---|---|---|---|---|---|
| Stage 1 |  |  |  |  |  |  |
| Dowfax 2A1 | 3.0 | 3.0 | 3.0 | 3.0 | 3.0 | 3.0 |
| styrene | 80 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| hydroxyethyl acrylate | — | — | — | — | 8.3 | — |
| deionized water | 30 | 30 | 30 | 30 | 30 | — |
| Stage 2 |  |  |  |  |  |  |
| styrene | 80 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| acrylic acid | — | — | 5.6 | — | 5.6 | 11.2 |
| methacrylic acid | — | — | — | 5.6 | — | — |
| hydroxyethyl acrylate | 7.5 | — | — | — | 8.3 | — |
| acrylamide | — | 5.6 | — | — | — | — |
| deionized water | 15 | 30 | 15 | 15 | 15 | 15 |
| Stage 3 |  |  |  |  |  |  |
| styrene | 82 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| acrylic acid | — | — | 5.6 | — | 5.6 | 11.2 |
| methacrylic acid | — | — | — | 5.6 | — | — |
| hydroxyethyl acrylate | 7.5 | — | — | — | 8.3 | — |
| acrylamide | — | 5.6 | — | — | — | — |
| deionized water | 45 | 45 | 15 | 45 | 45 | 45 |
| Dowfax 2A1 | 4.5 | 4.5 | 4.5 | 4.5 | 4.5 | 4.5 |
| Stage 4 |  |  |  |  |  |  |
| styrene | 82 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| acrylic acid | — | — | 5.6 | — | 5.6 | 11.2 |
| methacrylic acid | — | — | — | 5.6 | — | — |
| hydroxyethyl acrylate | 7.5 | — | — | — | 8.3 | — |
| acrylamide | — | 5.6 | — | — | — | — |
| deionized water | 15 | 30 | 15 | 15 | 15 | 15 |

The latex was then filtered through a 325 mesh screen to remove small quantities of coagulum. The bimodal latex had a total solids content of about 49.5 wt %, pH of about 6.5, surface tension of 42 dyne/cm and a Brookfield viscosity of 110 cps. The particle size distribution was measured using a capillary hydrodynamic fractionation apparatus. Two modes were observed at 659 Å and 1566 Å. The smaller size particles were about 25% of the distribution on a weight basis and the larger size particles were about 75% on a weight basis. The bimodal latex had a gel content of about 55%.

After the addition of the polymerizable mixture of Stage 4 to the reactor the mixture was reacted to about 29 to 33 wt % solids and then reseeded. In the reseeding stage a mixture of deionized water 50 g, Avirol 2020 (30%) 50 g, sodium persulfate 2.3 g and styrene 52 g was added to the reactor. The following polymerizable mixtures identified in stages in Table 6 below for each example were then sequentially added to the reactor every 30 minutes.

TABLE 6

| | Example 3 Weight, gram | Example 4 Weight, gram | Example 5 Weight, gram | Example 6 Weight, gram | Example 7 Weight, gram | Example 8 Weight, gram |
|---|---|---|---|---|---|---|
| Stage 1 | | | | | | |
| styrene | 80 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| acrylic acid | — | — | 5.6 | — | 5.6 | 11.2 |
| methacrylic acid | — | — | — | 5.6 | — | — |
| hydroxyethyl acrylate | 7.5 | — | — | — | 8.3 | — |
| acrylamide | — | 5.6 | — | — | — | — |
| deionized water | 15 | 30 | 15 | 15 | 15 | 15 |
| Stage 2 | | | | | | |
| styrene | 80 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| acrylic acid | — | — | 5.6 | — | 5.6 | 11.2 |
| methacrylic acid | — | — | — | 5.6 | — | — |
| hydroxyethyl acrylate | 7.5 | — | — | — | 8.3 | — |
| acrylamide | — | 5.6 | — | — | — | — |
| deionized water | 89 | 75 | 89 | 89 | 89 | 89 |
| Dowfax 2A1 | 4.5 | 4.5 | 4.5 | 4.5 | 4.5 | 4.5 |
| sodium persulfate | 1.5 | 1.5 | 1.5 | 1.5 | 1.5 | 1.5 |
| Stage 3 | | | | | | |
| styrene | 80 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| acrylic acid | — | — | 5.6 | — | 5.6 | 11.2 |
| methacrylic acid | — | — | — | 5.6 | — | — |
| hydroxyethyl acrylate | 7.5 | — | — | — | 8.3 | — |
| acrylamide | — | 5.6 | — | — | — | — |
| deionized water | 15 | 30 | 15 | 15 | 15 | 15 |
| Stage 4 | | | | | | |
| styrene | 80 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| acrylic acid | — | — | 5.6 | — | 5.6 | 11.2 |
| methacrylic acid | — | — | — | 5.6 | — | — |
| hydroxyethyl acrylate | 7.5 | — | — | — | 8.3 | — |
| acrylamide | — | 5.6 | — | — | — | — |
| deionized water | 45 | 45 | 45 | 45 | 45 | 45 |
| Dowfax 2A1 | 3.0 | 3.0 | 3.0 | 3.0 | 3.0 | 3.0 |
| Stage 5 | | | | | | |
| styrene | 80 | 82 | 77 | 82 | 77 | 77 |
| dodecyl mercaptan | 2.5 | 2.5 | 2.5 | 2.5 | 2.5 | 2.5 |
| butadiene | 60 | 60 | 57 | 60 | 57 | 60 |
| acrylonitrile | — | — | 8.3 | — | — | — |
| acrylic acid | — | — | 5.6 | — | 5.6 | 11.2 |
| methacrylic acid | — | — | — | 5.6 | — | — |
| hydroxyethyl acrylate | 7.5 | — | — | — | 8.3 | — |
| acrylamide | — | 5.6 | — | — | — | — |
| deionized water | 15 | 30 | 15 | 15 | 15 | 15 |

The polymerizable mixture was then reacted in the reactor until constant solids. The conversion of monomers to polymer was about 98%.

Sodium hydroxide (13%) 81 g, deionized water 150 g, sodium persulfate 3 g, Drew L198 3 g were added to the reactor and allowed to react for 60 minutes and then cooled to 150° F. and transferred to a stripping vessel and steam stripped and filtered in a conventional manner for approximately 3 hours or until the residual styrene was 0.05 wt % or less. The bimodal latex was then cooled to 75° F. A biocide Kathon LX (3.5%) 24.3 g was then added to the bimodal latex. The latex was then filtered through a 325 mesh screen to remove small quantities of coagulum.

The total solids content, pH, surface tension, Brookfield viscosity, particle size distribution and gel content were measured for each of the bimodal latices of Examples 3–8 and reported in Table 7 below.

TABLE 7

| | Example 3 | Example 4 | Example 5 | Example 6 | Example 7 | Example 8 |
|---|---|---|---|---|---|---|
| total solids content | 50.5 | 46.5 | 49.6 | 48.8 | 5.5 | 50.7 |
| pH | 8.6 | 8.4 | 6.6 | 7.8 | 6.1 | 6.1 |
| Surface tension | 42 | 46.6 | 37.5 | 48.9 | 38.2 | 45.6 |
| Brookfield viscosity | 93 | 280 | 94 | 42 | 148 | 166 |
| particle size distribution | 654Å - 20 wt % 1545Å - 80 wt % | 633Å - 15 wt % 1725Å - 85 wt % | 623Å - 20 wt % 1661Å - 80 wt % | 637Å - 10 wt % 1547Å - 90 wt % | 800Å 18 wt % 1762Å - 82 wt % | 594Å - 25 wt % 1482Å - 75 wt % |
| gel content | 55% | 59% | 67% | 55% | 62% | 69% |

EXAMPLE 9

Several different paper coating formulations including the bimodal latex of Example 2 and mineral pigments, a dispersant, carboxymethyl cellulose thickener, modified starch cobinder, calcium stearate lubricant were prepared in standard mixers as well known in the art. The compositions of the dry solids of the paper coating formulations are provided in Table 8 and identified as A, B, C and D. In addition, paper coating formulations including the bimodal latices of Examples 3–8 and mineral pigments, a dispersant, carboxymethyl cellulose thickener, modified starch cobinder, calcium stearate lubricant were also prepared. The compositions of the dry solids of the paper coating formulations are provided in Table 5 and identified as E. The parts of all formulation components, except for the filler pigments clay, calcium carbonate and titanium dioxide are based on fractions of 100 parts of total dry solids of pigment. The coating formulations A, B, C, D and E including the bimodal latices of Examples 2–8 were neutralized to a pH of about 8.0–8.5 with sodium hydroxide and applied to different grade sheets F, G, H, I and J under the conditions depicted in Table 9. Subsequently, the coated paper sheets were supercalendared in a single-nip laboratory equipment with three passes at 600 PLI and 100° F.

TABLE 8

| Coatings\Sample | A | B | C | D | E |
|---|---|---|---|---|---|
| No. 1 Clay | 75% | 50% | 75% | 50% | 75% |
| fine ground calcium carbonate | 25% | 44% | 25% | 44% | 25% |
| titanium dioxide | — | 6% | — | 6% | — |
| sodium polyacrylate dispersant | 0.05 | 0.05 | 0.05 | 0.05 | 0.5 |
| carboxymethyl cellulose | 0.1 | 0.35 | — | 0.35 | 0.35 |
| modified starch | — | — | 3 | — | — |
| calcium stearate lubricant | 1.0 | 1.0 | — | 1.0 | 1.0 |
| latex | 16 | 16 | 12 | 16 | 16 |
| water | to 66% total dry solids | to 68% total dry solids | to 62.5% total dry solids | to 68% total dry solids | to 64% total dry solids |

TABLE 9

| Paper Coating Condition\Paper Sheet | F | G | H | I | J[1] |
|---|---|---|---|---|---|
| coat weight | 10 lbs/3300 ft$^2$ | 10 lbs/3300 ft$^2$ | 8.5 lbs/3300 ft$^2$ | 10 lbs/3300 ft$^2$ | 10 lbs/3300 ft$^2$ |
| paper grade type | sheet offset paper | sheet offset type II | sheet/web offset type III | sheet offset type I | sheet offset type II |
| Application method | manual application using rod drawdowns | manual application using rod drawdowns | manual application using rod drawdowns | application using a CLC ™ 6000 Cylindrical Laboratory Coater running at 3000 feet/minute | cylindrical laboratory coater at 3000 ft/min |
| Drying | Infrared/bot air | Infrared/bot air | Infrared/bot air | Infrared | Infrared |

[1] calendaring with 4 passes through a single-nip laboratory equipment at 500 PLI and 165° F.

The coated papers were then tested to determine ink set rate, printing binding strength (P&I Stability), paper gloss, print gloss, Gurley porosity, Prufbau Wet Pick and Prufbau Ink Refusal.

The coated papers were subjected to a P&I Stability test on a flatbed Vandercook proofing press. The press has a flat, adjustable bed and a motorized printing cylinder that is covered with an offset blanket. After ink is applied to the blanket, the cylinder was moved forward on impression and over the paper sheet. As the inked blanket prints the paper sheet the force required to release the printed sheet from the blanket is measured. Without replenishing the ink film repeated prints are made and each time the release force is measured. This procedure simulates a paper printed with an ink in the first units of a press contacting subsequent blankets during multicolor printing. The slope of the line connecting the second and last passes is the rate at which an ink sets on a given substrate. The higher the slope the more absorbent the paper sheet is to ink oil/solvent and the higher the ink tack buildup. For example, traditionally an open porous coated sheet has a higher slope than a tight non-porous sheet. When the paper coating picks onto the blanket during the P&I Stability test, testing is stopped, and the number of passes is noted as Passes-to-Fail. Typically, paper sheets must withstand a minimum of 4 passes to resist printing press picking, piling and tail edge picking problems. For a more detailed discussion of the P&I Stability test reference is made to "Predicting print mottle: a method of differentiating between three types of mottle", 173–184, Vol. 77, No. 7 TAPPI Journal, Nancy Plowman Sandreuter, incorporated herein by reference.

In addition, the coating binding strength was determined by IGT Pick testing and by IGT Wet Pick testing according to standard methods of measurement by the Technical Association of the Pulp and Paper Industry (TAPPI) as well known in the art. A measure of dry and wet binding strength is provided by IGT Pick testing pursuant to TAPPI Useful Method UM 591, Surface Strength of Paper. The IGT dry pick strength measures the speed, in cm/sec, required to lift the paper coating off of the surface of a paper strip when printed using an ink rolled and standard conditions as described in UM 591. Higher numbers indicate better resistance to picking when the paper is being commercially printed in an offset press. When the paper sample is being wetted with water prior to testing in the IGT tester the test is called the IGT Wet Pick.

The coated papers were also evaluated for optical, strength and printing properties using standard methods of measurement by TAPPI. These tests include brightness (T452), gloss (T480), opacity (T425), stiffness (Gurley-type) (T453), porosity (Gurley-type) (T536) and Sheffield smoothness (T538). Ink gloss was measured after printing the paper with a magenta heat set ink and taking three measurements to report the data at 1.6 ink density. Testing for Prufbau Wet Pick and Prufbau Ink Refusal and Ink Transfer were also determined for each paper sheet. The sum of Wet Pick, Ink Refusal and Ink Transfer equals 100 percent. Prufbau Wet Pick, Prufbau Ink Refusal and Prufbau Ink Transfer, also referred to as "the water/fountain solution interference test", is a well known procedure in the paper and printing industry developed by the manufacturer of the Prufbau laboratory printing press. Lower wet pick numbers indicate that it requires more force to lift off wetted coating, and generally, corresponds to high wet strength. Typically, high ink transfer and low ink refusal are desirable. Porosity of coated papers is usually measured with a Gurley Porosimeter as well known in the art where the time is counted for a preselected volume of air to flow through a sample. A more porous sample would allow air to more freely pass through it and, consequently, corresponds to shorter time periods in seconds. Because the time for flow would depend on the paper thickness, one also needs to normalize the values obtained for the caliper of the paper. The numbers reported are for 2.5 cc air volume and are normalized for the sheet caliper. Traditionally, porous coatings are desirable to avoid formation of blisters during drying of coatings after their application. Conventional styrene butadiene type latices that give porous coatings are too "open" and induce fast ink setting, high tack buildup, low passes to fail and high slopes. The polymer latices in accordance with the present invention provide a unique balance of porous coatings with low slopes and high passes to fail. The results of the tests are provided in Tables 10 and 11.

TABLE 10

| Test Property\Sample | A & F | B & G | C & H | D & I |
|---|---|---|---|---|
| Slope[1] | 6.5 | 4.5 | 7.7 | 11 |
| Passes to Fail | 8 | >10 | 7 | 6 |
| IGT Dry Pick, cm/s | 238 | — | 78 | — |
| Paper Gloss, % | 70 | 73 | 71 | 62.2 |
| Print Gloss, % | 92.5 | 92 | 80.6 | 79.8 |
| Gurley Porosity[1], s | 79 | 112 | 40 | 74 |
| Prufbau Wet Pick[1], % | 1 | 7 | 30 | 3 |
| Prufbau Ink Refusal, % | 84 | 81 | 20 | 33 |
| Prufbau Ink Transfer, % | 15 | 12 | 50 | 64 |

[1] lower values indicate better performance

TABLE 11

| Test Property\Sample | E & J | E & J | E & J | E & J | E & J | E & J |
|---|---|---|---|---|---|---|
| Bimodal latex | Example 3 | Example 4 | Example 5 | Example 6 | Example 7 | Example 8 |
| Slope[1] | 11 | 10 | 6 | 9 | 12 | 9 |
| Passes-to-Fail | 6 | 6 | 9 | 7.5 | 5.5 | 6 |
| IGT Dry Pick, cm/s | 286 | 218 | 246 | 203 | 259 | 234 |
| Paper Gloss, % | 58.3 | 54.8 | 56.7 | 56.7 | 57.3 | 52.7 |
| Print Gloss, % | 83.2 | 70.9 | 80.1 | 72.8 | 76.3 | 78.8 |
| Gurley Porosity[1], s | 56 | 53 | 68 | 49 | 44 | 58 |
| Prufbau Wet Pick[1], % | -3 | 0 | -1 | 3 | -5 | 4 |
| Prufbau Ink Refusal, % | 44 | 36 | 43 | 45 | 32 | 24 |
| Prufbau Ink Transfer, % | 59 | 64 | 58 | 52 | 73 | 72 |

[1] lower values indicate better performance

The latices in accordance with the present invention provide high printing strength, as demonstrated by low P&I Slopes, high P&I Passes-to-Failure, high IGT Dry Pick and advantageous Prufbau Wet Pick. The latices provide low P&I test Slopes indicating slower adsorption of the offset ink vehicle into the coated sheet and a reduced rate of ink tack buildup after repeated sequential passes over the inked blanket area. The Slopes are lower (meaning better performance) than 8 units for rod drawdown applications and less than 13 units for high speed laboratory coater applications. Similarly, Passes-to-Fail are greater than 5. Improved P&I test results, also supported by high IGT Dry Pick resistance and good Prufbau Wet Pick, are important for superior offset printing press printability, particularly when using the latices in coating formulations with low levels of starch cobinder. Also, coatings containing the latices of the invention have good Gurley Porosity (i.e., low numbers) suggesting porous coatings which are desirable for certain types of offset printing papers. Additionally, coated papers made with coatings containing latices of the invention have good paper and ink gloss and high ink transfer.

The documents, patents and patent applications referred to herein are hereby incorporated by reference.

Having described presently preferred embodiments of the present invention, it is to be understood that it may be otherwise embodied within the scope of the appended claims.

What is claimed is:

1. A multi-stage emulsion polymerization process for preparing a high strength bimodal latex, the process comprising the steps of:
    a) forming a first polymeric seed in-situ by charging into a reaction zone of a reactor an aqueous emulsion polymerizable mixture including at least one emulsion polymerizable monomer, surfactant, chelating agent and free radical initiator;
    b) subsequently charging to the reaction zone of the reactor over a plurality of sequential stages an aqueous emulsion polymerizable mixture including at least one polymerizable monomer, about 1.0 to 2.0 wt % chain transfer agent and about 0 to 5 wt % surfactant at a charge rate faster than the polymerization rate of the at least one polymerizable monomer;
    c) reacting the emulsion polymerizable mixture of step b) to about 70 to 80 percent conversion;
    d) forming a second polymeric seed in-situ in the presence of unreacted monomer from step b) by charging into the reaction zone of the reactor an aqueous emulsion polymerizable mixture including at least one emulsion polymerizable monomer, surfactant and free radical initiator;
    e) subsequently charging to the reaction zone of the reactor over a plurality of sequential stages an aqueous emulsion polymerizable mixture including at least one polymerizable monomer, about 0.5 to 2.0 wt % chain transfer agent and about 0 to 5 wt % surfactant at a charge rate faster than the polymerization rate of the at least one polymerizable monomer; and
    f) reacting the emulsion polymerizable mixture of step e) to a conversion of about 98 percent to form the bimodal latex.

2. The process of claim 1 wherein the first polymeric seed is formed by charging into the reaction zone of the reactor an aqueous emulsion polymerizable mixture including ethylenically unsaturated carboxylic acid, monolefinic monomer, surfactant, chelating agent and free radical initiator.

3. The process of claim 2 wherein the first polymeric seed is formed by charging into the reaction zone of the reactor an aqueous emulsion polymerizable mixture including itaconic acid, styrene, surfactant, chelating agent and free radical initiator.

4. The process of claim 3 wherein the first polymeric seed is formed by charging into the reaction zone of the reactor an aqueous emulsion polymerizable mixture including about 1.0 to 2.0 wt % itaconic acid, about 10.0 to 14.0 wt % styrene, about 0.1 to 0.2 wt % sodium dodecyl diphenyloxide disulfonate, about 0.1 to 0.3 wt % ethylene diamine tetra-acetic acid and about 0.5 to 1.0 wt % sodium persulfate.

5. The process of claim 1 wherein the second polymeric seed is formed by charging into the reaction zone of the reactor an aqueous emulsion polymerizable mixture including a monoolefinic monomer, surfactant and free radical initiator.

6. The process of claim 5 wherein the second polymeric seed is formed by charging into the reaction zone of the reactor an aqueous emulsion polymerizable mixture including styrene, surfactant and free radical initiator.

7. The process of claim 6 wherein the second polymeric seed is formed by charging into the reaction zone of the reactor an aqueous emulsion polymerizable mixture including about 35 to 60 wt % styrene, about 10 to 20 wt % sodium lauryl sulfate and about 1.0 to 2.0 wt % sodium persulfate.

8. The process of claim 1 wherein the aqueous emulsion polymerizable mixtures of step b) include about 30 to 50 wt % monoolefinic monomer, about 25 to 40 wt % aliphatic conjugated diene monomer and about 0 to 10 wt % ethylenically unsaturated monomer selected from the group consisting of ethylenically unsaturated carboxylic acid, esters of ethylenically unsaturated carboxylic acid, amides of ethylenically unsaturated carboxylic acid and nitriles of ethylenically unsaturated carboxylic acid.

9. The process of claim 8 wherein the aqueous emulsion polymerizable mixtures of step b) include about 30 to 50 wt % styrene, about 25 to 40 wt % butadiene and about 0 to 10 wt % acrylic acid.

10. The process of claim 9 wherein the aqueous emulsion polymerizable mixtures of step b) include about 1.0 to 2.0 wt % dodecyl mercaptan and about 0 to 5 wt % sodium dodecyl diphenyloxide disulfonate.

11. The process of claim 1 wherein the aqueous emulsion polymerizable mixtures of step e) include about 30 to 50 wt % monoolefinic monomer, about 20 to 40 wt % aliphatic conjugated diene monomer and about 2.0 to 10.0 wt % ethylenically unsaturated monomer selected from the group consisting of ethylenically unsaturated carboxylic acid, esters of ethylenically unsaturated carboxylic acid amines of ethylenically unsaturated carboxylic acid and nitriles of ethylenically unsaturated carboxylic acid.

12. The process of claim 11 wherein said ethylenically unsaturated monomer is selected from the group consisting of acrylic acid, hydroxyethyl acrylate, acrylamide, acrylonitrile and methacrylic acid.

13. The process of claim 11 wherein the aqueous emulsion polymerizable mixtures of step e) include about 30 to 50 wt % styrene, about 20 to 40 wt % butadiene and about 2.0 to 10.0 wt % acrylic acid.

14. The process of claim 13 wherein the aqueous emulsion polymerizable mixtures of step e) include about 0.5 to 2.0 wt % dodecyl mercaptan and about 0 to 5 wt % sodium dodecyl diphenyloxide disulfonate.

15. The process of claim 1 wherein the aqueous emulsion polymerizable mixture is a batch addition to the reactor.

16. A multi-stage emulsion polymerization process for preparing a bimodal latex, the process comprising the steps of:

a) forming a first polymeric seed in-situ by charging into a reactor an aqueous emulsion polymerizable mixture including at least one emulsion polymerizable monomer, surfactant, chelating agent and free radical initiator;

b) charging to the reactor over a plurality of sequential stages an aqueous emulsion polymerizable mixture including at least one polymerizable monomer, a chain transfer agent and a surfactant at a charge rate faster than the polymerization rate of the at least one polymerizable monomer;

c) reacting the emulsion polymerizable mixture of step b) to about 70 to 80 percent conversion;

d) forming a second polymeric seed in-situ in the presence of unreacted monomer from step b) by charging into the reactor an aqueous emulsion polymerizable mixture including at least one emulsion polymerizable monomer, surfactant and free radical initiator;

e) charging to the reactor over a plurality of sequential stages an aqueous emulsion polymerizable mixture including at least one polymerizable monomer, a chain transfer agent and a surfactant at a charge rate faster than the polymerization rate of the at least one polymerizable monomer; and f) reacting the emulsion polymerizable mixture of step e) to form the bimodal latex wherein the bimodal latex contains no more than about 50 wt % polymeric solids and has about 10–50 wt % polymer particles of a size of approximately 500–800 A and has about 50–90 wt % polymer particles of a size of approximately 1500–2000 A.

17. A multi-stage emulsion polymerization process for preparing a high strength bimodal latex, the process comprising the steps of:

a) forming a first polymeric seed in situ by charging into a reactor an aqueous emulsion polymerizable mixture including ethylenically unsaturated carboxylic acid, monolefinic monomer, surfactant, chelating agent and free radical initiator;

b) sequentially charging to the reactor over a plurality of stages an aqueous emulsion polymerizable mixture including at least one polymerizable monomer, a chain transfer agent and a surfactant at a feed rate faster than the polymerization rate of the at least one polymerizable monomer;

c) reacting the emulsion polymerizable mixture of step b) to about 70 to 80 percent conversion to form a first mode latex particle;

d) forming a second polymeric seed in-situ in the presence of unreacted monomer from step b) by charging into the reactor an aqueous emulsion polymerizable mixture including a monoolefinic monomer, surfactant and free radical initiator;

e) sequentially charging to the reactor over a plurality of stages an aqueous emulsion polymerizable mixtures including at least one polymerizable monomer, a chain transfer agent and a surfactant at a feed rate faster than the polymerization rate of the at least one polymerizable monomer; and f) reacting the emulsion polymerizable mixture of step e) to form a second mode latex particle.

* * * * *